United States Patent
Schwarz et al.

(10) Patent No.: US 7,736,775 B2
(45) Date of Patent: Jun. 15, 2010

(54) FUEL CELL SYSTEM AND METHOD FOR OPERATING A FUEL CELL SYSTEM

(75) Inventors: Torsten Schwarz, Klosterhäseler (DE); Sven Schmitz, Gifhorn (DE); Christoph Maume, Isenbüttel (DE)

(73) Assignee: Volkswagen AG, Wolfsburg (DE)

( * ) Notice: Subject to any disclaimer, the term of this patent is extended or adjusted under 35 U.S.C. 154(b) by 1246 days.

(21) Appl. No.: 11/280,613

(22) Filed: Nov. 16, 2005

(65) Prior Publication Data

US 2006/0105224 A1 May 18, 2006

(30) Foreign Application Priority Data

Nov. 16, 2004 (DE) .................. 10 2004 055 158

(51) Int. Cl.
- H01M 8/04 (2006.01)
- H01M 2/00 (2006.01)
- H01M 8/00 (2006.01)
- H10M 8/12 (2006.01)

(52) U.S. Cl. ............... 429/17; 429/34; 429/12; 429/25

(58) Field of Classification Search ............ 429/17, 429/34, 12, 25
See application file for complete search history.

(56) References Cited

U.S. PATENT DOCUMENTS 6,849,352 B2   2/2005   Formanski et al.

FOREIGN PATENT DOCUMENTS

| DE | 44 46 841 A1 | 7/1996 |
| DE | 195 48 297 A1 | 6/1997 |
| DE | 101 15 336 A1 | 10/2002 |
| WO | 96/20506 | 7/1996 |

*Primary Examiner*—Patrick Ryan
*Assistant Examiner*—Helen O Conley

(57) ABSTRACT

A fuel cell system has a fuel cell stack composed of a plurality of fuel cells with a cathode side having a cathode inlet and a cathode outlet and an anode side having an anode inlet and an anode outlet. It is possible for a hydrogen-containing medium to be fed to the anode side and an oxygen-containing medium to be fed to the cathode side. It is further possible for at least some of the anode exhaust gas to be fed to the cathode side. An anode-side exhaust-gas line opens into an opening in a feed line for the oxygen-containing medium on a suction side of a compressor that feeds the oxygen to the cathode.

2 Claims, 1 Drawing Sheet

FUEL CELL SYSTEM AND METHOD FOR OPERATING A FUEL CELL SYSTEM

BACKGROUND OF THE INVENTION

Field of the Invention

The invention relates to a fuel cell system and to a method for operating a fuel cell system. The fuel cell system comprises a fuel cell stack composed of a plurality of fuel cells with a cathode side having a cathode inlet and a cathode outlet and an anode side having an anode inlet and an anode outlet. Hydrogen-containing medium is fed to the anode side and an oxygen-containing medium is fed to the cathode side. At least some of the anode exhaust gas can be fed to the cathode side.

Low-temperature fuel cell systems are particularly suitable for automotive use, on account of their favorable operating temperatures. Electrical energy can be obtained if, in a manner known per se, hydrogen is fed to the anode side of a fuel cell and oxygen is fed to the cathode side of the fuel cell, in order to produce the fuel cell reaction. In a fuel cell stack, hydrogen and oxygen are fed to the individual fuel cells via gas distribution structures. The oxygen source used is often ambient air. The hydrogen source used may be an organic fuel or alternatively hydrogen gas. On the one hand, systems with reforming stages, wherein hydrogen-rich reformate is obtained from the organic fuel, and on the other hand systems which are operated with pure hydrogen gas, are known. The former are of relatively complex construction and also complex to operate, on account of the need for reforming stages, whereas the latter are distinguished by a correspondingly less complex structure. In the latter systems, anode exhaust gas is often recirculated to the anode inlet and, after mixing with fresh hydrogen, is fed back to the anode.

Therefore, these systems need to be purged at intervals, so that drops of water and inert gases are forced out of the gas distribution structure of the fuel cells. In the process, clean and dry hydrogen gas is blown through the gas distribution structure at a relatively high flow rate and/or in blasts.

To ensure that the hydrogen gas is not released into the environment, it is known, for example, to catalytically burn anode exhaust gas using what are known as TGC (Tail Gas Combustor) units.

It is has become known from German published patent application DE 101 15 336 A1 and its counter-part U.S. Pat. No. 6,849,352 B2 instead to feed the anode exhaust gas to the cathode side and mix it with air compressed by a compressor before feeding this mixture to the fuel cell stack, reacting it at the catalyst within the fuel cell and discharging the reaction product water via the cathode exhaust gas.

SUMMARY OF THE INVENTION

It is accordingly an object of the invention to provide a fuel cell system and an operating method which overcome the above-mentioned disadvantages of the heretofore-known devices and methods of this general type and which enable anode exhaust gas from a fuel cell to be disposed of more efficiently and reliably.

With the foregoing and other objects in view there is provided, in accordance with the invention, a fuel cell system, comprising:

a fuel cell stack composed of a plurality of fuel cells, said fuel cell stack having a cathode side formed with a cathode inlet and a cathode outlet and an anode side formed with an anode inlet and an anode outlet, said anode side being connected to receive a hydrogen-containing medium and said cathode side being connected to receive an oxygen-containing medium; and a feed line for the oxygen-containing medium connected to said cathode inlet and a compressor connected in said feed line;

an anode-side exhaust gas line connected between said anode outlet and a suction side of said compressor, said exhaust gas line carrying anode exhaust gas and feeding at least some of the anode exhaust gas to said cathode side via said feed line.

In other words, the fuel cell system according to the invention comprises a fuel cell stack composed of a plurality of fuel cells with a cathode side having a cathode inlet and a cathode outlet and an anode side having an anode inlet and an anode outlet, it being possible for a hydrogen-containing medium to be fed to the anode side and an oxygen-containing medium to be fed to the cathode side, and it being possible for at least some of the anode exhaust gas to be fed to the cathode side, according to the invention has the feature that an anode-side exhaust-gas line opens out at an opening into a feed line for the oxygen-containing medium on a suction side of a compressor. Release of hydrogen during a purge operation can be completely avoided. By the time it reaches the cathode of the fuel cell stack, the anode exhaust gas is sufficiently mixed with the oxygen-containing medium, preferably air, and then reacted at the cathode catalyst. The oxygen required for the catalytic oxidation is taken from the cathode feed air. Since an excess of air is usually employed here, if the purge volume is small there is not likely to be a deficit of air for the fuel cell stack. Ignition of the hydrogen at standard compressor temperatures is unlikely, since the ignition temperature at atmospheric pressure is approximately 560° C.

If higher purge volumetric flows are required or desired in the fuel cell system, a vessel for collecting anode exhaust gas, wherein anode exhaust gas can be temporarily stored, may be arranged in the exhaust-gas line. A restrictor, which enables small quantities of anode exhaust gas to be admixed with the cathode feed air on the suction side of the compressor over a prolonged period of time, is preferably arranged in the exhaust-gas line between the vessel and the opening of the exhaust-gas line.

With the above and other objects in view there is also provided, in accordance with the invention, a method of operating a fuel cell system, the fuel cell system having a fuel cell stack composed of a plurality of fuel cells with a cathode side having a cathode inlet and a cathode outlet and an anode side having an anode inlet and an anode outlet, the method which comprises:

feeding a hydrogen-containing medium to the anode side;
feeding an oxygen-containing medium to the cathode side through a feed line with a compressor having a suction side;
feeding, at least from time to time, at least a portion of an anode exhaust gas through an exhaust-gas line to the suction side of the compressor in the feed line for the oxygen-containing medium.

In other words, in the method according to the invention for operating a fuel cell system comprising a fuel cell stack composed of a plurality of fuel cells with a cathode side having a cathode inlet and a cathode outlet and an anode side having an anode inlet and an anode outlet, a hydrogen-containing medium being fed to the anode side and an oxygen-containing medium being fed to the cathode side, and at least some of the anode exhaust gas being fed to the cathode side, anode exhaust gas, at least from time to time, is fed via an exhaust-gas line to a suction side of a compressor in a feed line for the oxygen-containing medium.

In accordance with an additional feature of the invention, anode exhaust gas is preferably collected in a vessel in the exhaust-gas line.

In accordance with a concomitant feature of the invention, anode exhaust gas can be fed in metered quantities to the suction side for a prolonged period of time via a restrictor.

Other features which are considered as characteristic for the invention are set forth in the appended claims.

Although the invention is illustrated and described herein as embodied in a fuel cell system and an operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
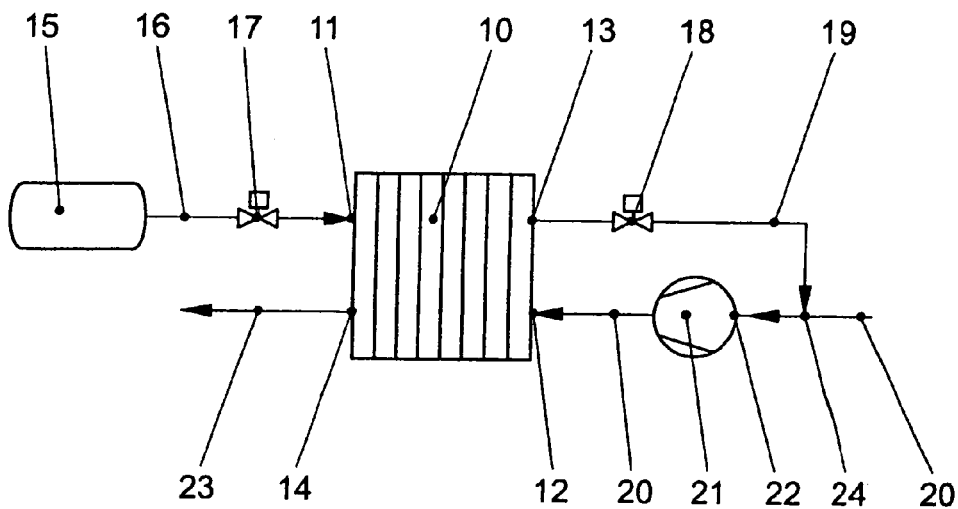
FIG. 1 is a schematic diagram of a first preferred configuration of a fuel cell system according to the invention.

Referring now to the figures of the drawing in detail and first, particularly, to FIG. 1 thereof, there is shown a first preferred configuration of a diagrammatically depicted fuel cell system. A fuel cell stack 10 comprising a plurality of individual fuel cells has an anode inlet 11 on the anode side. Hydrogen is supplied at the anode inlet 11 from a storage tank 15 via a feed line 16. An anode outlet 13 with an exhaust-gas line 19 for the anode exhaust gas is also provided at the anode side of the stack. Between the anode outlet 13 and the opening 24 there is a valve 18, which can be used to set a purge volume when purging the anode side of the fuel cell stack 10 with hydrogen. Furthermore, a valve 17 is arranged between the storage tank 15 and the anode inlet 11.

On the cathode side, an oxygen-containing medium, for example air, can be fed to a cathode inlet 12 via a feed line 20 and can be discharged from the fuel cell stack 10 via a cathode outlet 14 and an exhaust-gas line 23. A compressor 21, which delivers a mass flow of air and compresses the air to the required pressure level, is arranged in the feed line.

The exhaust-gas line 19 of the anode exhaust gas opens out into the feed line for the cathode feed air at an opening 24 upstream of a suction side 24 of the compressor.

Figure 2:
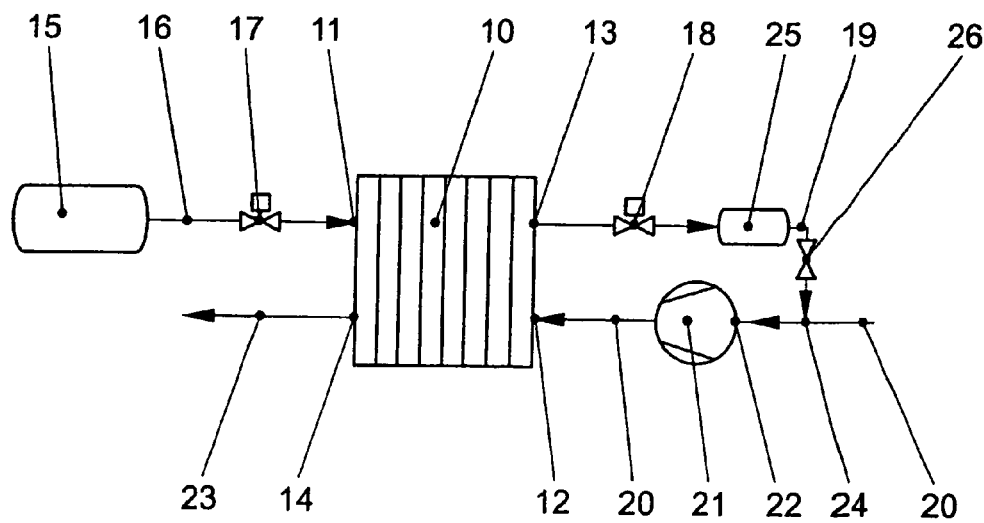
FIG. 2 is a similar view of a further preferred configuration of a fuel cell system with a temporary reservoir for anode exhaust gas.

The preferred configuration illustrated in FIG. 2 shows a further development of the system shown in FIG. 1. The reference numerals used in FIG. 2 correspond to those employed in FIG. 1 for identical or comparable components. To avoid repetition, for corresponding components reference is made to the description of these components given in FIG. 1.

In addition, in the configuration shown in FIG. 2, the fuel cell system has a vessel 25, with a restrictor or throttle 26 connected downstream of it, in the exhaust-gas line 19 for the anode exhaust gas. This enables anode exhaust gas to be collected in the event of relatively high volumetric flows during the purge operation and then admixed with the cathode feed air on the suction side of the compressor 21 distributed in smaller quantities for a prolonged period of time by way of the restrictor.

This application claims the priority, under 35 U.S.C. §119, of German Patent Application DE 10 2004 055 158.8, filed Nov. 16, 2004; the entire disclosure of the prior application is herewith incorporated by reference.

We claim:

1. A fuel cell system, comprising:
a fuel cell stack composed of a plurality of fuel cells, said fuel cell stack having a cathode side formed with a cathode inlet and a cathode outlet and an anode side formed with an anode inlet and an anode outlet, said anode side being connected to receive a hydrogen-containing medium and said cathode side being connected to receive an oxygen-containing medium;
a feed line for the oxygen-containing medium connected to said cathode inlet and a compressor connected in said feed line;
an anode-side exhaust gas line connected between said anode outlet and a suction side of said compressor, said exhaust gas line carrying anode exhaust gas and feeding at least some of the anode exhaust gas to said cathode side via said feed line; and
the fuel cell system further including a reservoir vessel for collecting anode exhaust gas connected in said exhaust-gas line and a restrictor connected in said exhaust-gas line between said reservoir vessel and an inlet opening formed in said exhaust-gas line.

2. A method of operating a fuel cell system, the fuel cell system having a fuel cell stack composed of a plurality of fuel cells with a cathode side having a cathode inlet and a cathode outlet and an anode side having an anode inlet and an anode outlet, the method which comprises:
feeding a hydrogen-containing medium to the anode side;
feeding an oxygen-containing medium to the cathode side through a feed line with a compressor having a suction side;
feeding, at least from time to time, at least a portion of an anode exhaust gas through an exhaust-gas line to the suction side of the compressor in the feed line for the oxygen-containing medium;
collecting anode exhaust gas in a reservoir vessel connected in the exhaust-gas line; and
feeding the anode exhaust gas in metered quantities to the suction side for a prolonged period of time via a restrictor.

* * * * *